US006946814B2

(12) United States Patent
Takemori et al.

(10) Patent No.: US 6,946,814 B2
(45) Date of Patent: Sep. 20, 2005

(54) STEPPING MOTOR DRIVER

(75) Inventors: Akio Takemori, Kiryu (JP); Yoshifumi Kuwano, Kiryu (JP); Yukinari Takahashi, Kiryu (JP); Hiroaki Taka, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/942,965

(22) Filed: Sep. 17, 2004

(65) Prior Publication Data
US 2005/0062451 A1 Mar. 24, 2005

(30) Foreign Application Priority Data

Sep. 24, 2003 (JP) ........................................ 2003-330808
Sep. 24, 2003 (JP) ........................................ 2003-330809

(51) Int. Cl.[7] .............................................. G05B 19/40
(52) U.S. Cl. ....................... 318/685; 318/701; 318/696; 318/254
(58) Field of Search ................................ 318/685–696, 318/139, 254, 439, 701, 721–723; 702/151; 477/176, 174

(56) References Cited

U.S. PATENT DOCUMENTS 4,740,738 A * 4/1988 El-Antably et al. ......... 318/701
6,730,001 B1 * 5/2004 Vohmann et al. ........... 477/176
2004/0204902 A1 * 10/2004 Kokubo et al. ............. 702/151
2004/0232862 A1 * 11/2004 Wogari et al. .............. 318/254

* cited by examiner

Primary Examiner—Paul Ip
(74) Attorney, Agent, or Firm—Birch Stewart Kolasch & Birch LLP

(57) ABSTRACT

A stepping motor driver comprises: an excitation angle generating means which generates an excitation angle from an external command pulse; a current control means which controls exciting currents for a stepping motor according to the excitation angle and a current command; a current detection means which detects phase currents of the stepping motor; an angle detection means which detects a rotor rotation angle of the stepping motor; a torque component current calculating means which calculates a torque component current from the phase currents and the rotor rotation angle; an absolute converting means which obtains the absolute value of the torque component current; and a current command output means which outputs the current command depending on the absolute value of the torque component current.

5 Claims, 4 Drawing Sheets

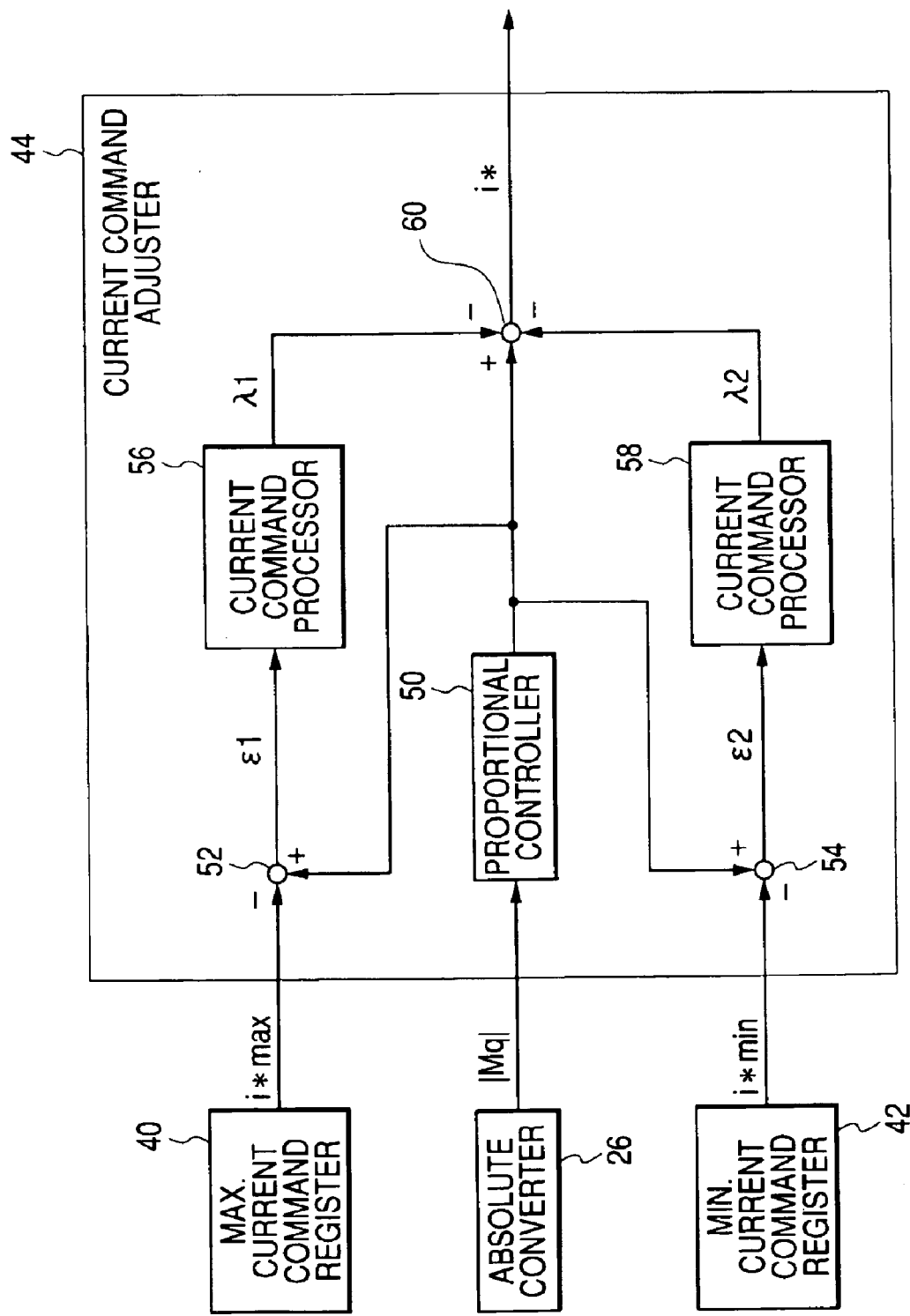

STEPPING MOTOR DRIVER

This Non-provisional application claims priority under 35 U.S.C. § 119(a) on Patent Application No(s). 2003-330808 and 2003-330809 filed in Japan on Sep. 24, 2003, the entire contents of which are hereby incorporated by reference.

BACKGROUND OF THE INVENTION

1. Field of the Invention

The present invention relates to a stepping motor driver which drives a stepping motor for control of the position and speed of driven equipment.

2. Description of the Prior Art

In most conventional stepping motors, a current command is fixed.

Therefore, there is a problem that a stepping motor consumes much power and is less efficient because a fixed current flows even while it is stopped or running at slow speed.

As a solution to this problem, the following approach to power consumption has been taken: during motor running, a command for a current which is enough to generate a required torque is selected and upon elapse of a given time after a motor stop, the value of the current command is decreased to the necessary minimum.

However, even in this case, since the current of the stepping motor is controlled with a fixed current command during motor running, its power consumption is considerable and its efficiency is low.

SUMMARY OF THE INVENTION

An object of the present invention is to provide a stepping motor driver which ensures that the power consumption of a stepping motor is low.

According to the present invention, a stepping motor driver comprises: an excitation angle generating means which generates an excitation angle from an external command pulse; a current control means which controls the exciting currents according to the excitation angle and a current command; a current detection means which detects phase currents of the stepping motor; an angle detection means which detects a rotor rotation angle of the stepping motor; a torque component current calculating means which calculates a torque component current from the phase currents and the rotor rotation angle; an absolute converting means which obtains the absolute value of the torque component current; and a current command output means which outputs the current command depending on the absolute value of the torque component current. This stepping motor driver supplies sinusoidally varying exciting currents to a stepping motor each time an external command pulse is applied.

In this stepping motor driver, it is possible to adjust the current command depending on the load of the stepping motor automatically and thus power consumption of the stepping motor can be reduced and heat generation of the stepping motor can be suppressed.

BRIEF DESCRIPTION OF THE DRAWINGS

The invention will be more particularly described with reference to the accompanying drawings, in which:

FIG. 4 is a block diagram partially showing the stepping motor driver shown in FIG. 3.

DETAILED DESCRIPTION OF THE PREFERRED EMBODIMENTS

Figure 1:
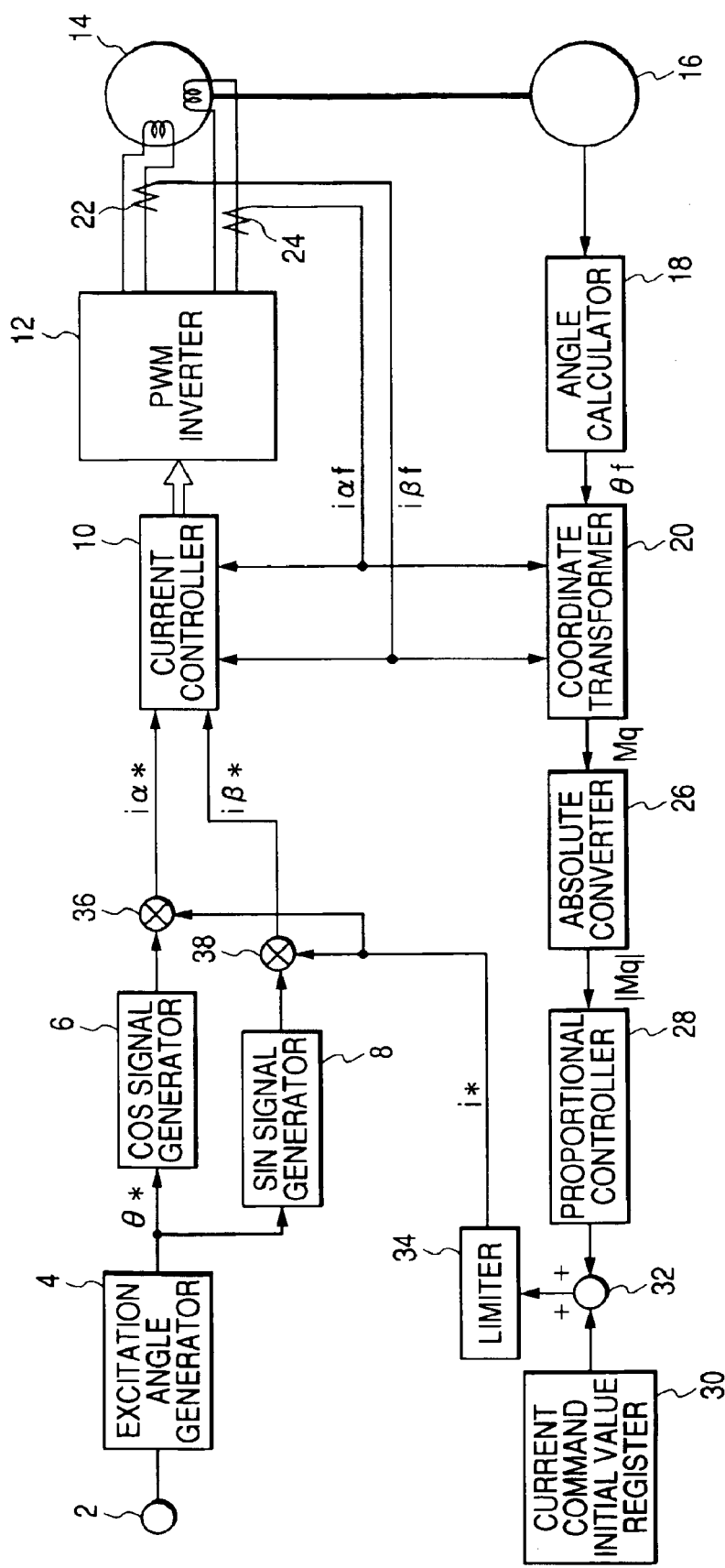
FIG. 1 is a block diagram showing a stepping motor driver according to an embodiment of the present invention.

Next, a stepping motor driver will be described referring to FIG. 1.

An excitation angle generator 4 generates an excitation angle θ* from an external command pulse added to an external command pulse input terminal 2. A COS signal generator 6 and a SIN signal generator 8 respectively generate COS signal COS* and SIN signal SIN* using the excitation angle θ*. Multipliers 36 and 38 multiply a current command i* (explained later) by COS signal COS* and SIN signal SIN* and generate alpha-phase current command iα* (i*cos θ*) and beta-phase current command iβ* (i*sin θ*) respectively. A current controller 10 receives phase currents iαf and iβf (explained later) and controls the exciting currents (motor winding currents) so as to let them agree with the alpha-phase current command iα* and beta-phase current command iβ* respectively.

A PWM inverter 12 applies a given voltage to a stepping motor 14 according to output of the current controller 10. In other words, a microstepping function is provided where, upon each application of an external command pulse, an exciting current varying in a sinusoidal manner is supplied to the stepping motor 14 and the basic step angle is divided into subdivisions, so that stepping rotation is made each time an external command pulse is applied. An angle sensor 16 (for example, an encoder or a resolver) is attached to the stepping motor 14 and an angle calculator 18 outputs a detected angle (rotor rotation angle of the stepping motor 14) θf according to a signal from the angle sensor 16. Current sensors 22 and 24 detect phase currents iαf and iβf of the stepping motor 14 respectively. A coordinate transformer 20 calculates a torque component current Mq from detected angle θf and phase currents iαf and iβf. The torque component current Mq is expressed by the following equation, in accordance with the relation shown in the motor vector diagram of FIG. 2.

$$Mq = -i\alpha f \cdot \sin\theta f + i\beta f \cdot \cos\theta f$$

An absolute converter 26 obtains the absolute value of torque component current Mq. A proportional controller 28 multiplies the absolute value of torque component current Mq by a coefficient to obtain a load torque equivalent. The above coefficient for the proportional controller 28 is 1 or more. An adder 32 adds a current command initial value set on a current command initial value register 30 to the load torque equivalent. Here, the current command initial value should be the minimum value required to obtain a starting torque at the start of the motor (at power input). If the sum of the current command initial value and the load torque equivalent exceeds a predetermined maximum i*max, a limiter 34 outputs the maximum current command value i*max; otherwise, the limiter 34 outputs the sum of the current command initial value and the load torque equivalent. Here, the maximum current command value i*max should be such that problems such as overcurrent, inverter damage and motor overheat do not occur due to an increase in the command current. The output of the limiter 34 is used as current command i*.

The excitation angle generator 4 constitutes an excitation angle generating means which generates an excitation angle from an external command pulse. The COS signal generator 6, SIN signal generator 8, multipliers 36 and 38 and current controller 10 constitute a current control means which controls exciting currents according to the excitation angle and a current command. The current sensors 22 and 24 constitute a current detection means which detects phase currents of the stepping motor. The angle sensor 16 and the angle calculator 18 constitute an angle detection means which detects a rotor rotation angle of the stepping motor. The coordinate transformer 20 constitutes a torque component current calculating means which calculates a torque component current from the phase currents and the rotor rotation angle. The absolute converter 26 constitutes an absolute converting means which obtains the absolute value of the torque component current. The proportional controller 28, current command initial value register 30, adder 32 and limiter 34 constitute a current command output means which outputs the current command depending on the absolute value of the torque component current. The proportional controller 28 constitutes a proportional control means which outputs a load torque equivalent proportional to the absolute value of the torque component current. The adder 32 constitutes an addition means which adds the load torque equivalent to a current command initial value. The limiter 34 constitutes a limitation means which outputs a maximum current command value when the sum of the current command initial value and the load torque equivalent exceeds the maximum current command value.

In this stepping motor driver, when a command pulse is given to the external command pulse input terminal 2, the operational sequence is as follows: the excitation angle generator 4 generates an excitation angle $\theta^*$ from the external command pulse; the COS signal generator 6 and SIN signal generator 8 generate COS signal COS* and SIN signal SIN* respectively; the multipliers 36 and 38 generate alpha-phase current command $i\alpha^*$ and beta-phase current command $i\beta^*$ from the COS signal COS* and SIN signal SIN* and current command i*; the current controller 10 controls exciting currents for the stepping motor 14 in a way to let them agree with the alpha-phase current command $i\alpha^*$ and the beta-phase current command $i\beta^*$ respectively; and the PWM inverter 12 applies a given voltage to the stepping motor 14 according to the output of the current controller 10. Thus, the rotor of the stepping motor 14 rotates. Then, the angle calculator 18 outputs a detected angle $\theta f$; the current sensors 22 and 24 output phase currents $i\alpha f$ and $i\beta f$; the coordinate transformer 20 calculates torque component current Mq from the detected angle $\theta f$, phase currents $i\alpha f$ and $i\beta f$; the absolute converter 26 obtains the absolute value of the torque component current Mq; the proportional controller 28 obtains a load torque equivalent from the absolute value of the torque component current Mq; the adder 32 adds the load torque equivalent to the current command initial value; and the limiter 34 outputs current command i* depending on the load torque equivalent.

Figure 2:
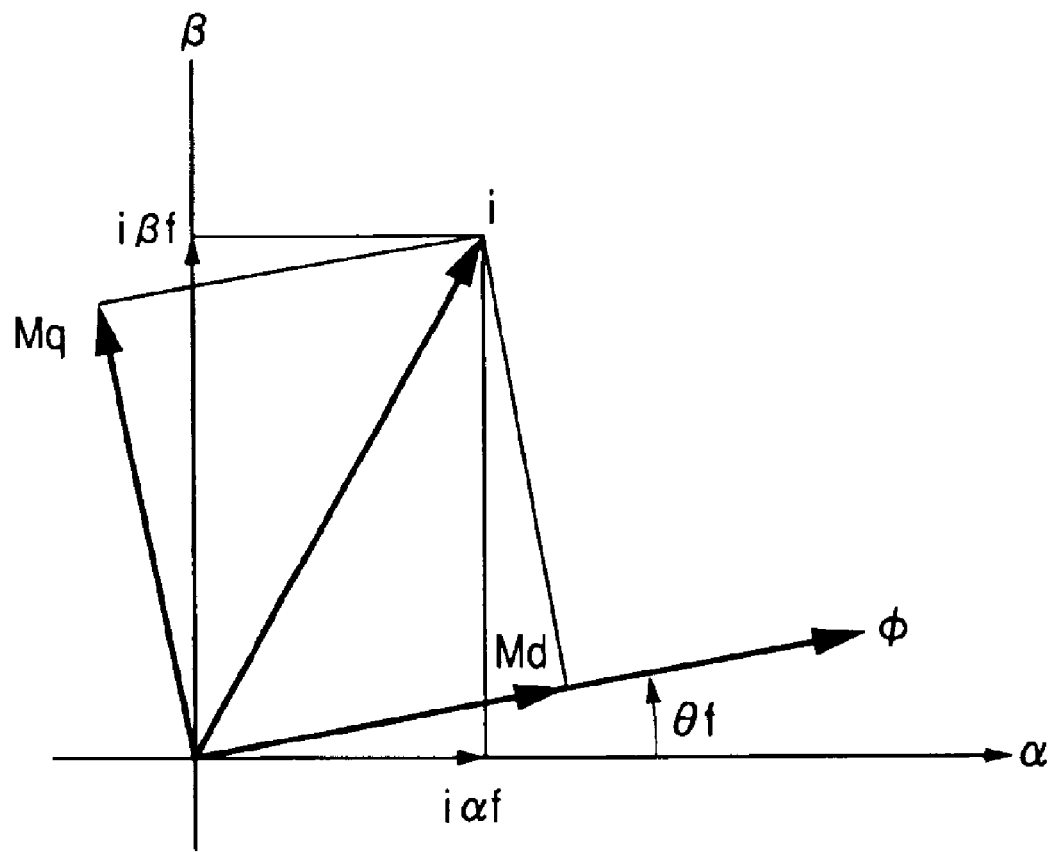
FIG. 2 is a motor vector diagram.

In this stepping motor driver, when the absolute value of the torque component current Mq increases, the load torque equivalent increases and thus the current command i* increases. Hence, the current in the stepping motor 14 becomes larger. On the other hand, when the absolute value of the torque component current Mq decreases, the load torque equivalent decreases and thus the current command i* decreases. Hence, the current in the stepping motor 14 becomes smaller. When the stepping motor 14 is stopped and the load torque is zero, the current vector i coincides with Md as shown in FIG. 2 and the torque component current Mq is zero. On the other hand, when the stepping motor 14 outputs a maximum torque, the current vector i coincides with Mq as shown in FIG. 2 and the torque component current Mq is the maximum. While the motor is running, the same is true and the torque component current Mq depends on the load torque. Therefore, when the absolute value of the load torque increases, the load torque equivalent increases and the current in the stepping motor 14 becomes larger. On the other hand, when the absolute value of the load torque decreases, the load torque equivalent decreases and the current in the stepping motor 14 becomes smaller, so power consumption is reduced and efficiency improved and heat generation of the stepping motor 14 suppressed. Even when the load torque equivalent is zero, the current command i* equals the current command initial value and therefore the stepping motor 14 is started properly. Even if the load torque equivalent is large, the current command i* does not exceed the maximum current command value i*max, problems such as inverter damage and motor overheat will not occur.

Figure 3:
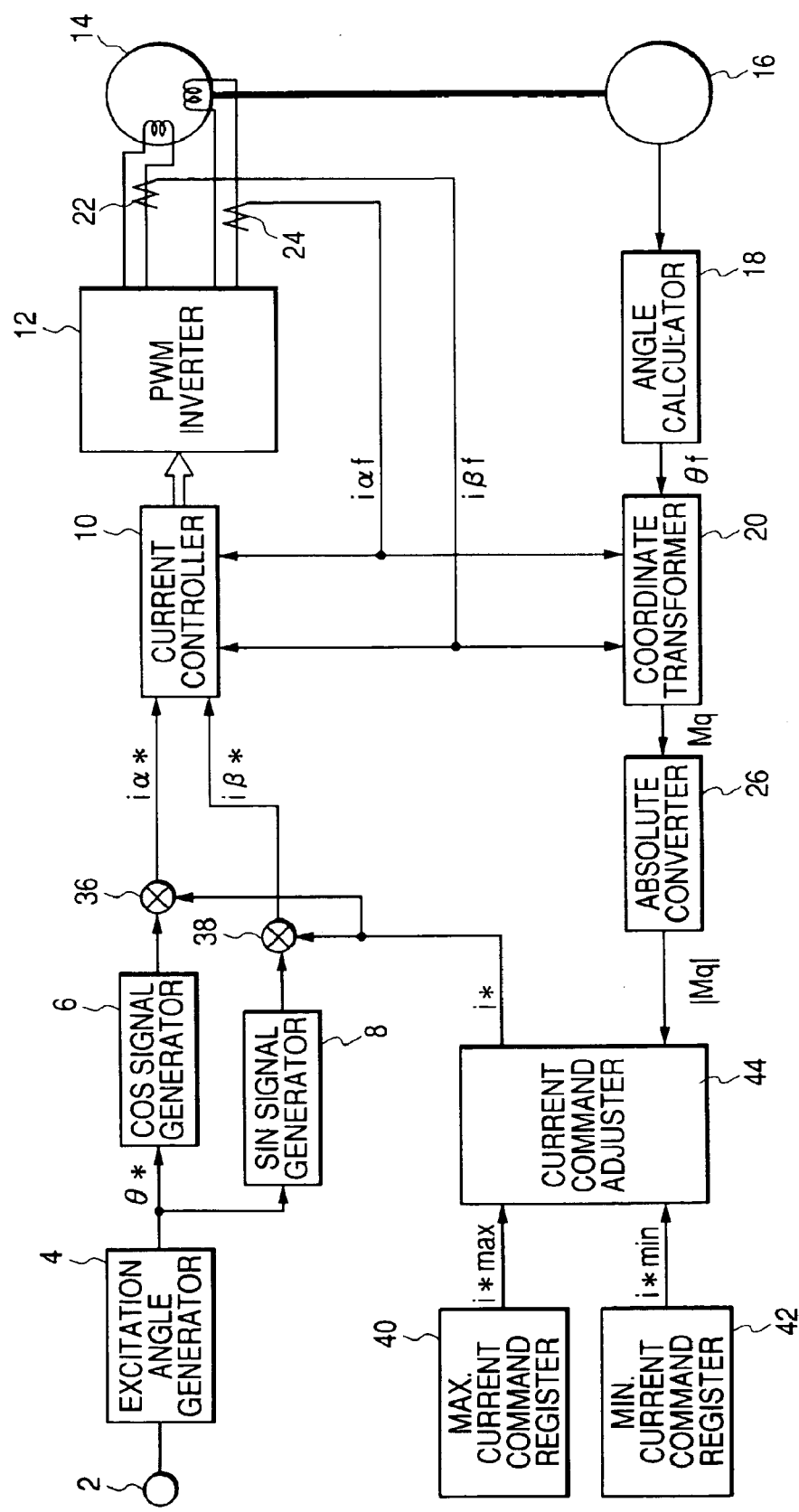
FIG. 3 is a block diagram showing a stepping motor driver according to another embodiment of the present invention.

Next, a stepping motor driver according to another embodiment of the present invention will be described referring to FIGS. 3 and 4.

A current command adjuster 44 receives the absolute value of torque component current Mq as an output of the absolute converter 26, a maximum current command value i*max set on a maximum current command register 40 and a minimum current command value i*min on a minimum current command register 42, and outputs a current command i*. Here, the maximum current command value i*max refers to the maximum current which can be supplied to the stepping motor 14, namely the maximum current value with which problems such as overcurrent, inverter damage and motor overheat cannot occur due to an increase in the current command value. The minimum current command value i*min refers to the minimum current required to obtain a starting torque at the start of the motor (at power input). The proportional controller 50 in the current command adjuster 44 multiplies the absolute value of the torque component current Mq by a coefficient to obtain a load torque equivalent. The above coefficient for the proportional controller 50 is 1 or more. An adder 52 obtains difference $\epsilon 1$ between the load torque equivalent and the maximum current command i*max. An adder 54 obtains difference $\epsilon 2$ between the load torque equivalent and the minimum current command i*min. A current command processor 56 receives difference $\epsilon 1$ and outputs $\lambda 1$. Here, when the difference $\epsilon 1$ is zero or less, the current command processor 56 outputs zero as $\lambda 1$; otherwise, its output $\lambda 1$ equals $\epsilon 1$. A current command processor 58 receives difference $\epsilon 2$ and outputs $\lambda 2$. Here, when the difference $\epsilon 2$ is zero or more, the current command processor 56 outputs zero as $\lambda 2$; otherwise, its output $\lambda 2$ equals $\epsilon 2$. An adder 60 subtracts outputs $\lambda 1$ and $\lambda 2$ from the load torque equivalent and outputs current command i*.

Accordingly, when the load torque equivalent is not less than the minimum current command value i*min and not more than the maximum current command value i*max, outputs $\lambda 1$ and $\lambda 2$ are zero and the current command adjuster 44 outputs a load torque equivalent as current command i*. When the load torque equivalent is less than the minimum current command value i*min, output $\lambda 1$ is zero and output $\lambda 2$ is the load torque equivalent minus the minimum current command value i*min, so the current command adjuster 44 outputs the minimum current command value i*min as the current command i*. When the load torque equivalent exceeds the maximum current command value i*max, output λ1 is the load torque equivalent minus the maximum current command value i*max and output λ2 is zero, so the current command adjuster 44 outputs the maximum current command value I*max as current command i*.

The maximum current command register 40, minimum current command register 42 and current command adjuster 44 constitute a current command output means which outputs a current command depending on the absolute value of the torque component current. The current command adjuster 44 constitutes a current command adjusting means which works as follows: when a load torque equivalent proportional to the absolute value of the torque component current is not less than a minimum current command value and not more than a maximum current command value, it outputs the load torque equivalent; when the load torque equivalent is less than the minimum current command value, it outputs the minimum current command value; and when the load torque equivalent exceeds the maximum current command value, it outputs the maximum current command value.

In this stepping motor driver, the proportional controller 50 obtains a load torque equivalent from the absolute value of the torque component current Mq. The adder 52 obtain difference ε1 between the load torque equivalent and the maximum current command i*max and the adder 54 obtains difference ε2 between the load torque equivalent and the minimum current command i*min. The current command processors 56 and 58 output λ1 and λ2 depending on differences ε1 and ε2 and the adder 60 outputs current command i* depending on the load torque equivalent and outputs λ1 and λ2.

In this stepping motor driver, when the load torque equivalent is not less than the minimum current command value i*min and not more than the maximum current command value i*max, current command i* equals the load torque equivalent. Therefore, since the load torque equivalent increases as the absolute value of the torque component current Mq increases, current command i* increases and the current in the stepping motor 14 becomes larger. On the other hand, when the absolute value of the torque component current Mq decreases, the load torque equivalent decreases, the current command i* decreases and the current in the stepping motor 14 becomes larger. As described above, the torque component current Mq depends on the load torque. Therefore, when the absolute value of the load torque increases, the current in the stepping motor 14 becomes larger and when the absolute value of the load torque decreases, the current in the stepping motor 14 becomes smaller. Hence power consumption can be reduced and efficiency can be improved and heat generation of the stepping motor 14 can be suppressed.

When the load torque equivalent is less than the minimum current command value i*min, the current command i* equals the minimum current command value i*min and the stepping motor 14 is started properly. When the load torque equivalent exceeds the maximum current command value i*max, the current command i* equals the maximum current command value i*max so inverter damage, motor overheat and similar problems will not occur.

The above explanation assumes that the stepping motor is a two-phase motor. However, the present invention may be applied to multiphase stepping motors.

What is claimed is:

1. A stepping motor driver which supplies sinusoidally varying exciting currents to a stepping motor each time an external command pulse is applied, comprising:
   (a) an excitation angle generating means which generates an excitation angle from the external command pulse;
   (b) a current control means which controls the exciting currents according to the excitation angle and a current command;
   (c) a current detection means which detects phase currents of the stepping motor;
   (d) an angle detection means which detects a rotor rotation angle of the stepping motor;
   (e) a torque component current calculating means which calculates a torque component current from the phase currents and the rotor rotation angle;
   (f) an absolute converting means which obtains the absolute value of the torque component current; and
   (g) a current command output means which outputs the current command depending on the absolute value of the torque component current.

2. The stepping motor driver as claimed in claim 1, wherein the current command output means has a proportional control means which outputs a load torque equivalent proportional to the absolute value of the torque component current.

3. The stepping motor driver as claimed in claim 2, wherein the current command output means has an addition means which adds the load torque equivalent to a current command initial value.

4. The stepping motor driver as claimed in claim 3, wherein, the current command output means has a limitation means which outputs a maximum current command value when the sum of the current command initial value and the load torque equivalent exceeds the maximum current command value.

5. The stepping motor driver as claimed in claim 1, wherein the current command output means has a current command adjusting means which, when a load torque equivalent proportional to the absolute value of the torque component current is not less than a minimum current command value and not more than a maximum current command value, outputs the load torque equivalent and, when the load torque equivalent is less than the minimum current command value, outputs the minimum current command value, and when the load torque equivalent exceeds the maximum current command value, outputs the maximum current command value.

* * * * *